(12) United States Patent
Chu et al.

(10) Patent No.: US 10,558,074 B2
(45) Date of Patent: *Feb. 11, 2020

(54) DISPLAY DEVICE HAVING IMPROVED LIGHT EMISSION AND COLOR REPRODUCIBILITY

(71) Applicant: Samsung Display Co., Ltd., Yongin-Si, Gyeonggi-Do (KR)

(72) Inventors: Seung-Jin Chu, Seoul (KR); Seung-Jin Baek, Suwon-si (KR); Young Min Kim, Asan-si (KR); Hae Il Park, Seoul (KR); Kun Hee Jo, Yongin-si (KR)

(73) Assignee: Samsung Display Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/353,996

(22) Filed: Mar. 14, 2019

(65) Prior Publication Data
US 2019/0212611 A1    Jul. 11, 2019

Related U.S. Application Data

(63) Continuation of application No. 15/490,699, filed on Apr. 18, 2017, now Pat. No. 10,241,360.

(30) Foreign Application Priority Data

Apr. 29, 2016 (KR) .......................... 10-2016-0052887

(51) Int. Cl.
G02F 1/1335    (2006.01)
(52) U.S. Cl.
CPC .. *G02F 1/133514* (2013.01); *G02F 1/133617* (2013.01); *G02F 2001/133562* (2013.01)

(58) Field of Classification Search
CPC ................ G02F 1/1335; G02F 1/1368; G02F 1/133377; G02F 1/133504; G02F 1/133509; G02F 1/133514
See application file for complete search history.

(56) References Cited

U.S. PATENT DOCUMENTS 9,952,740 B1    4/2018  Kim et al.
10,241,360 B2 *  3/2019  Chu .................. G02F 1/133514
(Continued)

FOREIGN PATENT DOCUMENTS

JP      2015-121569 A    7/2015
KR    10-2006-0037226 A    5/2006
KR    10-2012-0065950 A    6/2012

*Primary Examiner* — Dung T Nguyen
(74) *Attorney, Agent, or Firm* — Innovation Counsel LLP

(57) ABSTRACT

An exemplary display device includes: a display panel; a color conversion panel overlapping the display panel; and an optical bonding layer positioned between the display panel and the color conversion panel. The color conversion panel includes: a substrate; a color conversion layer and a transmission layer positioned between the substrate and the display panel; a first capping layer having one side facing the color conversion layer and the transmission layer, and another side facing the display panel; a second capping layer positioned between the first capping layer and the display panel; and an optical layer positioned between the first capping layer and the second capping layer and/or between the second capping layer and the optical bonding layer. A refractive index of the optical layer is lower than at least one of a refractive index of the first capping layer and a refractive index of the second capping layer.

20 Claims, 5 Drawing Sheets

(56) References Cited

U.S. PATENT DOCUMENTS

2015/0124188 A1    5/2015   Kadowaki et al.
2017/0090247 A1    3/2017   Lee et al.
2018/0024404 A1    1/2018   Suzuki et al.

* cited by examiner

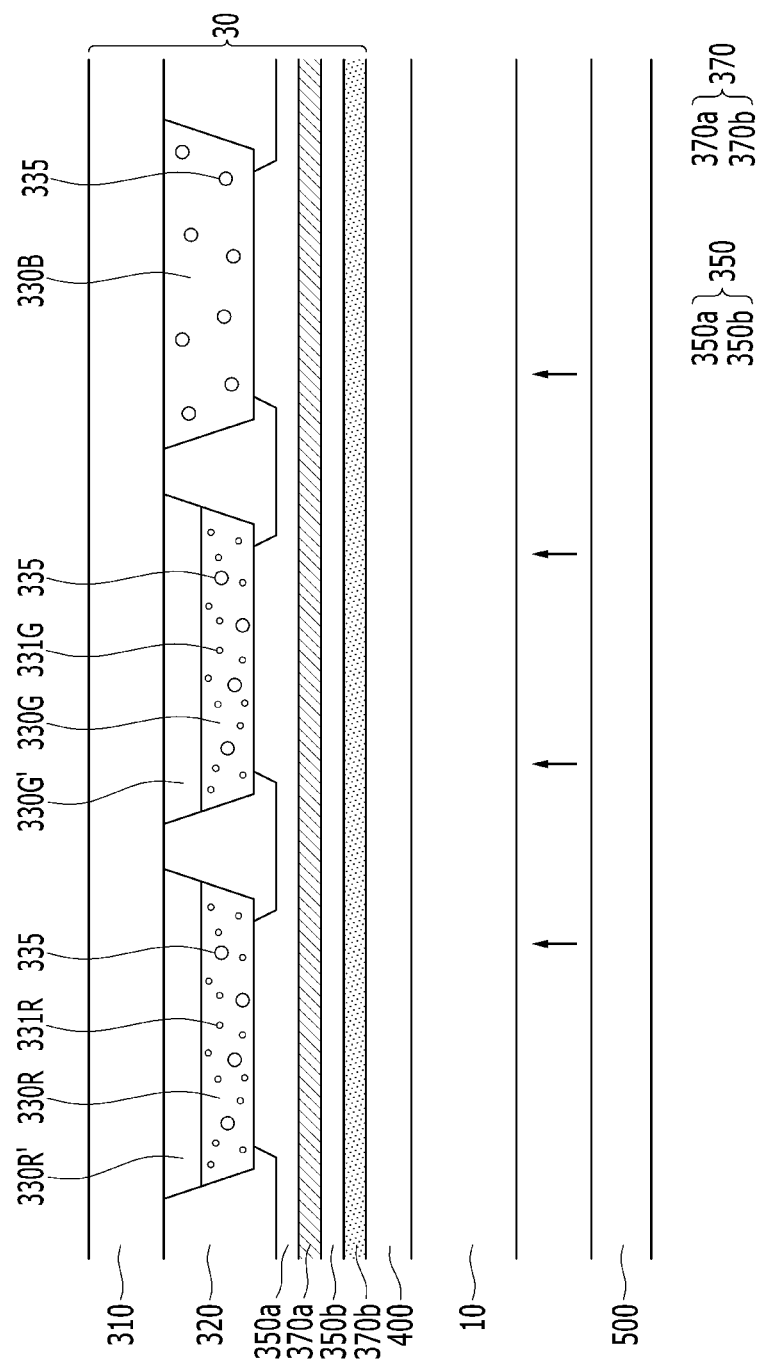

DISPLAY DEVICE HAVING IMPROVED LIGHT EMISSION AND COLOR REPRODUCIBILITY

CROSS-REFERENCE TO RELATED APPLICATION

This application is a continuation application of U.S. patent application Ser. No. 15/490,699 filed on Apr. 18, 2017, which claims priority under 35 USC § 119 to Korean Patent Application No. 10-2016-0052887 filed on Apr. 29, 2016, in the Korean Intellectual Property Office, the disclosures of which are incorporated herein in their entirety by reference.

BACKGROUND (a) Field

The present disclosure relates generally to display devices. More specifically, the present disclosure relates to display devices having improved light emission and color reproducibility.

(b) Description of the Related Art

Among display devices, there is a liquid crystal display in which a field generating electrode is positioned in one of two display panels. A plurality of thin film transistors and a plurality of pixel electrodes are positioned in a matrix configuration on one display panel (hereinafter referred to as 'a thin film transistor array panel') included in the liquid crystal display. Color filters of red, green, and blue are positioned on the other display panel (hereinafter referred to 'a common electrode panel'), and a common electrode covers an entire surface thereof.

However, in the display device, light loss is generated in a polarizer and the color filters. Accordingly, a display device including a color conversion panel to realize the display device while reducing light loss and having high efficiency has been proposed.

The above information disclosed in this Background section is only for enhancement of understanding of the background of the invention and therefore it may contain information that does not form the prior art that is already known in this country to a person of ordinary skill in the art.

SUMMARY

Exemplary embodiments relate to a display device with an improved light emission rate and color reproducibility.

A display device according to an exemplary embodiment of the present invention includes: a display panel; a color conversion panel overlapping the display panel; and an optical bonding layer positioned between the display panel and the color conversion panel, wherein the color conversion panel includes: a substrate; a color conversion layer and a transmission layer positioned between the substrate and the display panel; a first capping layer having one side facing the color conversion layer and the transmission layer, and another side facing the display panel; a second capping layer positioned between the first capping layer and the display panel; and an optical layer positioned between the first capping layer and the second capping layer and/or between the second capping layer and the optical bonding layer. A refractive index of the optical layer is lower than at least one of a refractive index of the first capping layer and a refractive index of the second capping layer.

The optical layer may include a first optical layer positioned between the first capping layer and the second capping layer, and a second optical layer positioned between the second capping layer and the optical bonding layer.

The refractive index of the first optical layer may be lower than the refractive index of the first capping layer, and the refractive index of the second optical layer may be lower than the refractive index of the second capping layer.

The optical layer may include at least one of a fluorine-containing copolymer, porous silica, a porous silicon oxide, a silicon oxide, a porous metal oxide, a porous polymer, and an acryl-based resin.

The first capping layer may include silicon nitride.

The second capping layer may include at least one of $TiO_2$, SiNx, SiOx, TiN, AlN, $Al_2O_3$, $SnO_2$, $WO_3$, and $ZrO_2$.

The refractive index of the first capping layer may be about 1.8 to about 1.9, and the refractive index of the second capping layer may be about 1.4 to about 1.9.

A thickness of the optical layer may be less than the thickness of the optical bonding layer.

A ratio of the thickness of the optical bonding layer to the thickness of the optical layer may be about 1:5 to 1:1.

The display device may be a curved display device.

The display panel may include: a first substrate; a thin film transistor positioned on the first substrate; a pixel electrode connected to the thin film transistor; a common electrode arranged to form an electric field with the pixel electrode; a roof layer overlapping the pixel electrode; and a liquid crystal layer positioned in a plurality of microcavities positioned between the pixel electrode and the roof layer.

The optical bonding layer may include a fluoroacryl-based resin.

A color filter positioned between the substrate and the color conversion layer may be further included.

The color conversion layer may include a red color conversion layer and a green color conversion layer, and the red color conversion layer and the green color conversion layer may each include a quantum dot.

The color conversion layer and the transmission layer may include a scattering member.

A display device according to an exemplary embodiment of the present invention includes: a display panel; a color conversion panel overlapping the display panel; and an optical bonding layer positioned between the display panel and the color conversion panel, wherein the color conversion panel includes: a substrate; a color conversion layer and a transmission layer positioned between the substrate and the display panel; a first capping layer positioned between the color conversion layer and the transmission layer, and the display panel; a second capping layer positioned between the first capping layer and the display panel; and an optical layer positioned in at least one of between the first capping layer and the second capping layer and between the second capping layer and the optical bonding layer. At least one of an interface of the first capping layer and the optical layer and an interface of the second capping layer and the optical layer is configured to generate total reflection.

Light incident from the color conversion layer and the transmission layer toward the display panel may be totally reflected either between the first capping layer and the optical layer or between the second capping layer and the optical layer.

The display device may be a curved display device.

The display panel may include: a first substrate; a thin film transistor positioned on the first substrate; a pixel electrode connected to the thin film transistor; a common electrode forming an electric field with the pixel electrode; a roof layer overlapping the pixel electrode; and a liquid crystal layer positioned in a plurality of microcavities positioned between the pixel electrode and the roof layer.

According to exemplary embodiments, a light emission rate and color reproducibility of the display device are improved.

BRIEF DESCRIPTION OF THE DRAWINGS

FIG. 1A is a cross-sectional view of a display device according to an exemplary embodiment of the present invention.

DETAILED DESCRIPTION OF THE EMBODIMENTS

Figure 1B:
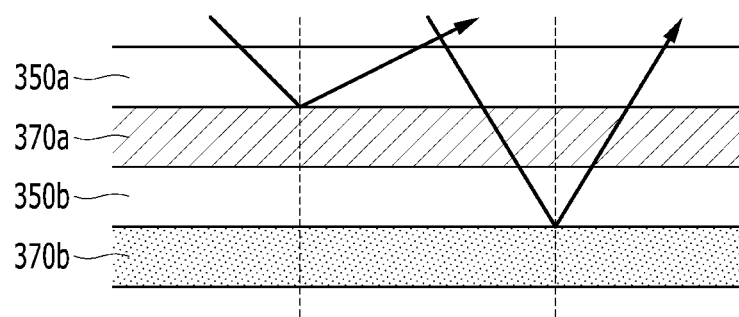
FIG. 1B is a schematic cross-sectional view illustrating further details of certain elements of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clearly explain the present invention, portions that are not directly related to the present invention are omitted, and the same reference numerals are attached to the same or similar constituent elements through the entire specification.

In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity. In the drawings, for better understanding and ease of description, the thicknesses of some layers and areas are exaggerated. The drawings are thus not to scale.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "on a plane" means viewing a target portion from the top, and the phrase "on a cross-section" means viewing a cross-section formed by vertically cutting a target portion from the side.

All numerical values are approximate, and may vary. All examples of specific materials and compositions are to be taken as nonlimiting and exemplary only. Other suitable materials and compositions may be used instead.

Figure 2:
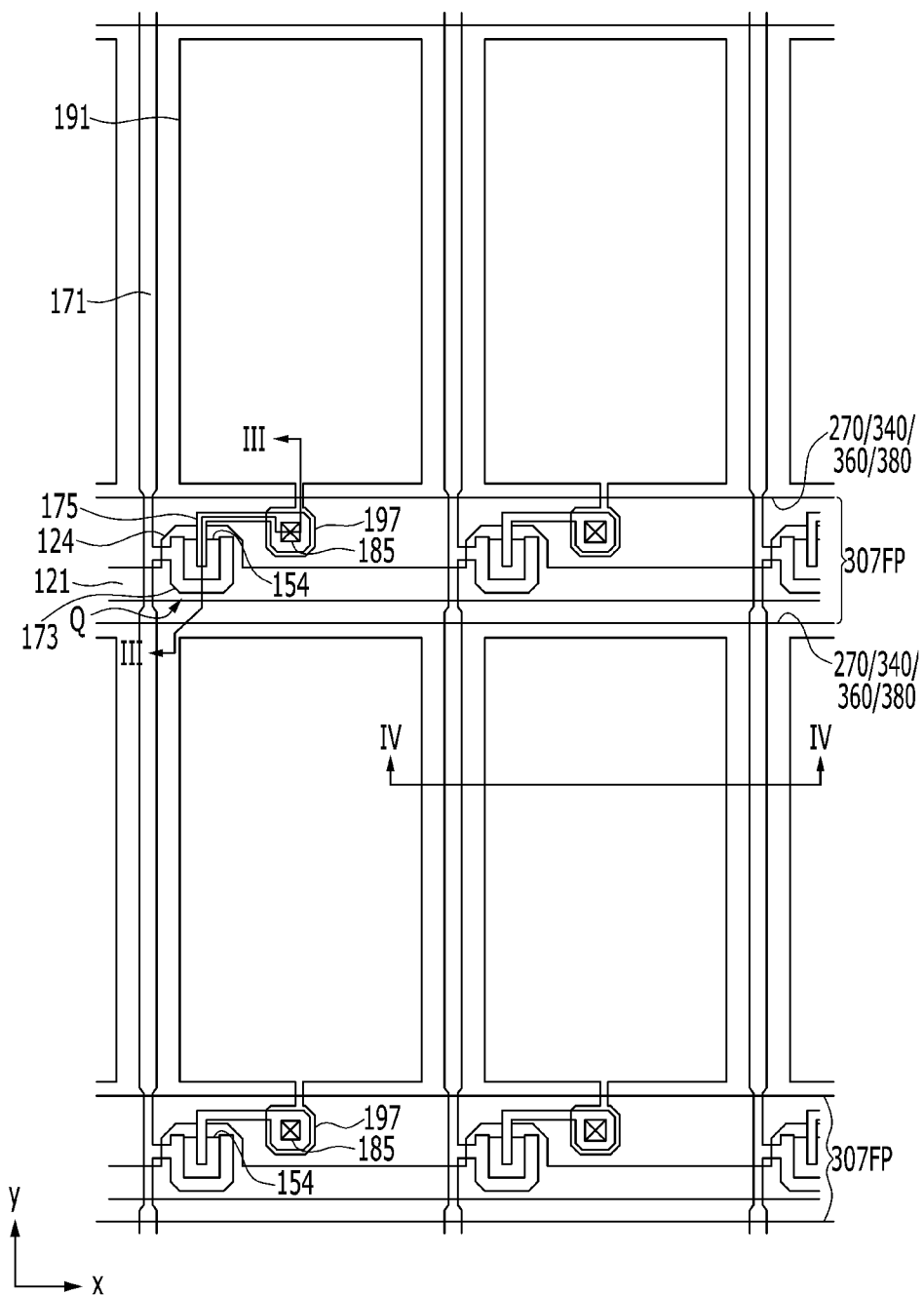
FIG. 2 is a top plan view of a pixel area according to an exemplary embodiment of the present invention.
Figure 3:
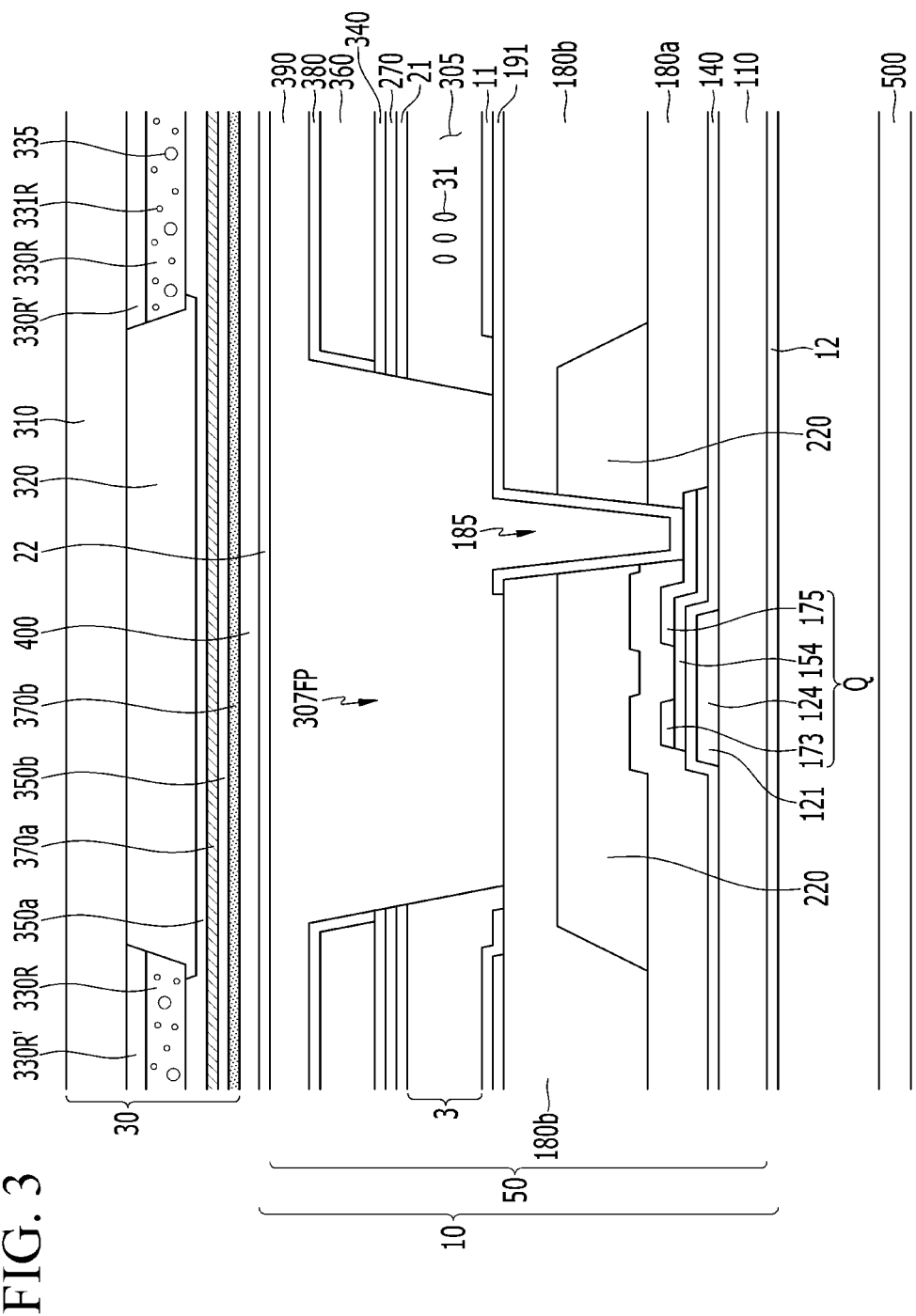
FIG. 3 is a cross-sectional view taken along line III-III of FIG. 2.
Figure 4:
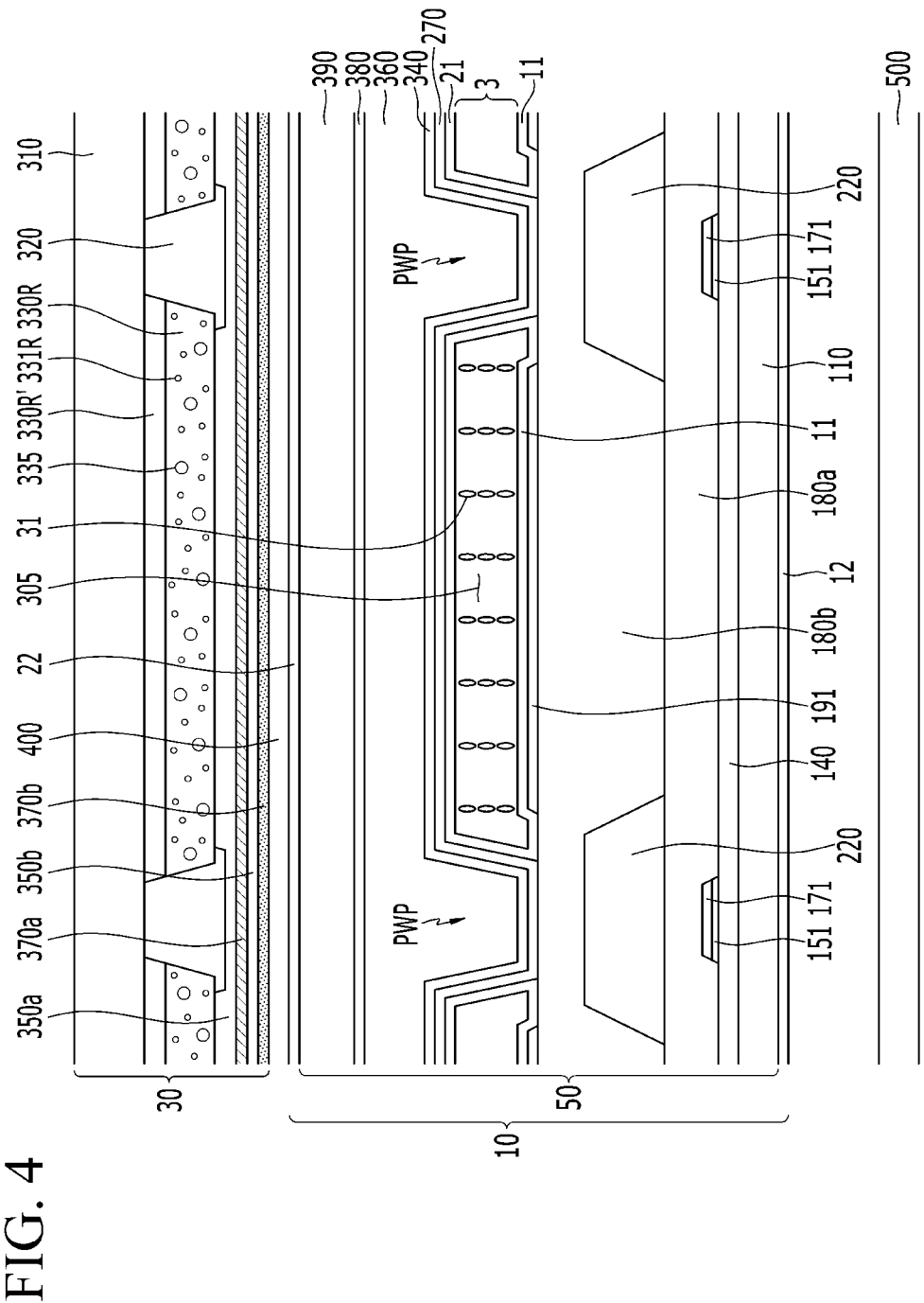
FIG. 4 is a cross-sectional view taken along line IV-IV of FIG. 2.

A display device according to an exemplary embodiment of the present invention will be described with reference to FIG. 1A to FIG. 4. FIG. 1A is a cross-sectional view of a display device according to an exemplary embodiment of the present invention, FIG. 1B is a schematic cross-sectional view illustrating further details of certain elements of the present invention, FIG. 2 is a top plan view of a pixel area according to an exemplary embodiment of the present invention, FIG. 3 is a cross-sectional view taken along line of FIG. 2, and FIG. 4 is a cross-sectional view taken along line IV-IV of FIG. 2.

First, referring to FIG. 1A, a display device according to an exemplary embodiment of the present invention includes a color conversion panel 30, a display panel 10 overlapping the color conversion panel 30, and a light assembly 500 providing light to the color conversion panel 30 and the display panel 10. The display panel 10 is positioned between the color conversion panel 30 and the light assembly 500. The color conversion panel 30 and the display panel 10 may be combined by an optical bonding layer 400.

The optical bonding layer 400 may be manufactured by coating a resin and performing UV irradiation to the resin. In this case, about 95% or more of a hardening of the resin is performed by the UV irradiation. The optical bonding layer 400 may include a fluoroacryl-based resin, however it is not limited thereto.

The display panel 10 does not include a separate column spacer. When the display device is curved, it is difficult to maintain a cell gap of the liquid crystal layer, but in an exemplary embodiment of the present invention, when using the optical bonding layer 400 hardened by the UV irradiation, stable fixing and combination of the display panel 10 and the color conversion panel 30 are possible. Accordingly, the display device according to an exemplary embodiment of the present invention may be provided as a curved type display panel.

Also, the optical bonding layer 400 according to an exemplary embodiment of the present invention may better prevent an edge lifting phenomenon between the display panel 10 and the color conversion panel 30, thereby preventing an unintended twist phenomenon of the display device.

The light assembly 500 may include a light source positioned under the display panel 10 and generating light, and a light guide (not shown) receiving the light and guiding the received light in a direction toward the display panel 10 and the color conversion panel 30.

As an example of the present invention, the light assembly 500 may include at least one light emitting diode (LED), e.g. a blue light emitting diode (LED). The light source of the present invention may be an edge-type light assembly disposed on at least one side of the light guide plate, or may be a direct-type assembly where the light source of the light assembly 500 is positioned directly underneath the light guide plate (not illustrated), however it is not limited thereto.

Next, the color conversion panel 30 is described.

The color conversion panel 30 includes a plurality of color conversion layers 330R and 330G, and a transmission layer 330B positioned between a substrate 310 and the display panel 10.

The plurality of color conversion layers 330R and 330G may emit the incident light as light of different colors, and as an example, may be a red color conversion layer 330R and a green color conversion layer 330G. The transmission layer 330B may emit incident light without separate color conversion, and as an example, receives and transmits blue light from the blue LEDs of the light assembly 500.

A light blocking member 320 may be positioned between the substrate 310 and the display panel 10, and may be positioned at the same layer as the color conversion layers 330R and 330G and the transmission layer 330B. The light blocking member 320 is positioned between adjacent color conversion layers, e.g. between any two adjacent ones of color conversion layers 330R and 330G and the transmission layer 330B, and more specifically, may define the region where the red color conversion layer 330R, the green color conversion layer 330G, and the transmission layer 330B are disposed. The light blocking member 320, and the adjacent red color conversion layer 330R, green color conversion layer 330G, and transmission layer 330B may partially overlap depending on the manufacturing process used.

The red color conversion layer 330R includes at least one of a phosphor and a quantum dot 331R for converting blue light that is incident thereto into red light. When the red color conversion layer 330R includes a red phosphor, the red phosphor may contain one of (Ca, Sr, Ba)S, (Ca, Sr, Ba)2Si5N8, CaAlSiN3, CaMoO4, and Eu2Si5N8, but is not limited thereto. The red color conversion layer 330R may include at least one kind of red phosphor.

The green color conversion layer 330G includes at least one of a phosphor and a quantum dot 331G for converting blue light that is incident thereto into green light.

When the green color conversion layer 330G includes the green phosphor, the green phosphor may contain one of yttrium aluminum garnet (YAG), $(Ca, Sr, Ba)_2SiO_4$, $SrGa_2S_4$, BAM, α-SiAlON, β-SiAlON, $Ca_3Sc_2Si_3O_{12}$, $Tb_3Al_5O_{12}$, $BaSiO_4$, CaAlSiON, and $(Sr_{1-x}Ba_x)Si_2O_2N_2$, but the present disclosure is not limited thereto. The green color conversion layer 330G may include at least one kind of green phosphor. In this case, the variable x may be any number between 0 and 1.

The red color conversion layer 330R and the green color conversion layer 330G may include a quantum dot for converting color instead of the phosphor, or may further include a quantum dot in addition to the phosphor. In this case, the quantum dot may be selected from a Group II-VI compound, a Group III-V compound, a Group IV-VI compound, a Group IV element, a Group IV compound, and any combination thereof.

The Group II-VI compound may be selected from a two-element compound selected from CdSe, CdTe, ZnS, ZnSe, ZnTe, ZnO, HgS, HgSe, HgTe, MgSe, MgS, and any mixture thereof; a three-element compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a four-element compound selected from HgZnTeS, CdZnSeS, CdZnSeTe, CdZnSTe, CdHgSeS, CdHgSeTe, CdHgSTe, HgZnSeS, HgZnSeTe, HgZnSTe, and any mixture thereof. The Group III-V compound may be selected from a two-element compound selected from GaN, GaP, GaAs, GaSb, AlN, AlP, AlAs, AlSb, InN, InP, InAs, InSb, and any mixture thereof; a three-element compound selected from GaNP, GaNAs, GaNSb, GaPAs, GaPSb, AlNP, AlNAs, AlNSb, AlPAs, AlPSb, InNP, InNAs, InNSb, InPAs, InPSb, and any mixture thereof; and a four-element compound selected from GaAlNAs, GaAlNSb, GaAlPAs, GaAlPSb, GaInNP, GaInNAs, GaInNSb, GaInPAs, GaInPSb, GaAlNP, InAlNP, InAlNAs, InAlNSb, InAlPAs, InAlPSb, and any mixture thereof. The Group IV-VI compound may be selected from a two-element compound selected from SnS, SnSe, SnTe, PbS, PbSe, PbTe, and any mixture thereof; a three-element compound selected from SnSeS, SnSeTe, SnSTe, PbSeS, PbSeTe, PbSTe, SnPbS, SnPbSe, SnPbTe, and any mixture thereof; and a four-element compound selected from SnPbSSe, SnPbSeTe, SnPbSTe, and any mixture thereof. The Group IV element may be selected from Si, Ge, and any mixture thereof. The Group IV compound may be a two-element compound selected from SiC, SiGe, and any mixture thereof.

In this case, the two-element compound, the three-element compound, or the four-element compound may exist in particles at a uniform concentration, or in the same particle while having different concentration distributions. Alternatively, they may have a core/shell structure where one quantum dot encloses another quantum dot. An interface between the core and the shell may have a concentration gradient such that a concentration of an element existing in the shell gradually decreases closer to a center of the interface.

The quantum dots 331R and 331G may have a full width at half maximum (FWHM) of the light-emitting wavelength spectrum that is equal to or less than about 45 nm, preferably equal to or less than about 40 nm, and more preferably equal to or less than about 30 nm, and in this range, color purity or color reproducibility may be improved. In addition, since light emitted by the quantum dot is emitted in all directions, a viewing angle of light may be improved.

In addition, the quantum dot is not specifically limited to have shapes that are generally used in the technical field related to the present disclosure, and more specifically, may have a shape such as a nano-particle having a spherical shape, a pyramid shape, a multi-arm shape, or a cubic shape, or may be a nanotube, a nanowire, a nanofiber, a planar nano-particle, etc.

The transmission layer 330B may include a resin that transmits blue light incident thereto. The transmission layer 330B is positioned in a region for emitting blue light, and thus emits the incident blue light at it is without a separate phosphor or quantum dot. Although not illustrated herein, in some exemplary embodiments, the transmission layer 330B may further include a dye or pigment.

The above-described red color conversion layer 330R, green color conversion layer 330G, transmission layer 330B, and light blocking member 320 may include a photosensitive resin as an example, and may be manufactured by a photolithography process. Alternatively, the red color conversion layer 330R, the green color conversion layer 330G, the transmission layer 330B, and the light blocking member 320 may be manufactured by a printing process, and when manufactured by the printing process, they may include materials other than the photosensitive resin.

In the present specification, it is illustrated that the color conversion layer, the transmission layer, and the light blocking layer are formed by a photolithography process or a printing process, but the present disclosure is not limited thereto.

At least one of the red color conversion layer 330R, the green color conversion layer 330G, and the transmission layer 330B may include a scattering member 335. For example, the red color conversion layer 330R, the green color conversion layer 330G, and the transmission layer 330B may each include the scattering member 335, but embodiments are not limited thereto. For example, the transmission layer 330B may include the scattering member 335, while the red color conversion layer 330R and the green color conversion layer 330G may not include the scattering member 335.

The scattering member 335 may include any material that can evenly scatter incident light, and for example, may include one of TiO2, ZrO2, Al2O3, In2O3, ZnO, SnO2, Sb2O3, and ITO.

On the other hand, referring to FIG. 1A, a red color filter 330R' may be positioned between the substrate 310 and the red color conversion layer 330R, and a green color filter 330G' may be positioned between the substrate 310 and the green color conversion layer 330G. The red color filter 330 R' and the green color filter 330G' may provide further improved color reproducibility, however exemplary embodiments contemplate both the presence and the absence of these additional color filters. Thus, for instance, the plurality of color filters 330R' and 330G' may be omitted.

A first capping layer 350a is located between the red color conversion layer 330R, the green color conversion layer 330G, the transmission layer 330B, and the light blocking member 320 on the one end, and the display panel 10 on the other.

The first capping layer 350a prevents damage to and extinction of the phosphor or the quantum dot in the red color conversion layer 330R and the green color conversion layer 330G, due to high temperature processes used in the formation of these color conversion layers.

The first capping layer 350a may include an inorganic material, and as an example, a silicon nitride ($SiN_x$). In this case, a refractive index of the first capping layer 350a may be in a range of about 1.8 to about 1.9.

A first optical layer 370a is positioned between the first capping layer 350a and the display panel 10. The first optical layer 370a is described further below.

Next, a second capping layer 350b is positioned between the first optical layer 370a and the display panel 10. The second capping layer 350b may be a filter transmitting light of a predetermined wavelength, and reflecting or absorbing light other than the predetermined wavelength.

Although not shown, the second capping layer 350b may have a structure in which a plurality of layers having different refractive indexes are stacked. The second capping layer 350b may include at least one of TiO2, SiNx, SiOx, TiN, AlN, Al2O3, SnO2, WO3, and ZrO2, and for example, may be a structure in which SiNx and SiOx are alternately stacked.

The second capping layer 350b may include a structure in which inorganic films having a high refractive index and inorganic films having a low refractive index are alternately stacked about 10 to 20 times, and utilize the above-described material. It may transmit or/and reflect the light of the specific wavelength by using reinforcement interference and/or destructive interference between the inorganic film having the high refractive index and the inorganic film having the low refractive index.

The refractive index of the second capping layer 350b may be in the range of about 1.4 to about 1.9.

A second optical layer 370b is positioned between the second capping layer 350b and the optical bonding layer 400. In this exemplary embodiment, the first optical layer 370a and the second optical layer 370b are both present. However, embodiments are not limited thereto, and an exemplary embodiment only including the first optical layer 370a or only the second optical layer 370b is possible. That is, the display device according to an exemplary embodiment of the present invention may include an optical layer 370 positioned either between the first capping layer 350a and the second capping layer 350b, between the second capping layer 350b and the optical bonding layer 400, or both.

The optical layer 370 may include at least one among a fluorine-containing copolymer, porous silica, a porous silicon oxide, a silicon oxide, a porous metal oxide, a porous polymer, and an acryl-based resin, however it is not limited thereto, and any material satisfying the predetermined refractive index is also possible. Further, the optical layer 370 may be manufactured without method limitation such as through an inkjet method, a coating method, or a slit method.

Next, the optical layer 370, including the first optical layer 370a and the second optical layer 370b, is described in detail.

The first optical layer 370a has a lower refractive index than the first capping layer 350a. The refractive index of the first capping layer 350a may be in a range of about 1.8 to 1.9, and the first optical layer 370a may have a refractive index of about 1.8 or less.

The red color conversion layer 330R, the green color conversion layer 330G, and the transmission layer 330B emit the light in all directions. In this case, in the color conversion panel 30, the light incident from the direction of the display panel 10 corresponds to light loss, accordingly it is necessary to again reflect the light in a user direction.

Referring to FIG. 1B, the light incident passing through the high refractive index first capping layer 350a falls incident to the low refractive index first optical layer 370a, such that light incident at a larger angle than a threshold angle may be again reflected back through the first capping layer 350a according to a principle of total reflection. That is, total reflection is generated in an interface between the first capping layer 350a and the first optical layer 370a. Accordingly, light direction is reflected back toward the user, thereby increasing the light emission rate of the display device.

Next, the second optical layer 370b has a lower refractive index than the second capping layer 350b. The refractive index of the second capping layer 350b may be in a range of about 1.4 to about 1.9, such that the second optical layer 370b may have a refractive index of about 1.4 or less.

Like the above-described principle, light passing through the higher refractive index second capping layer 350b falls incident to the lower refractive index second optical layer 370b, and light incident at a larger angle than a threshold angle may be reflected back up through the second capping layer 350b. That is, total reflection is generated at the interface of the second capping layer 350b and the second optical layer 370b.

The above-described first optical layer 370a and second optical layer 370b may respectively include different materials. Accordingly, the first optical layer 370a may include a material having a lower refractive index than the first capping layer 350a, and the second optical layer 370b may include a material having a lower refractive index than the second capping layer 350b.

Further, the first optical layer 370a and the second optical layer 370b may include the same material. The first optical layer 370a and the second optical layer 370b have a lower refractive index than the refractive index of the first capping layer 350a. Also, the first optical layer 370a and the second optical layer 370b have a lower refractive index than the refractive index of the second capping layer 350b. In this way, when having the lower refractive index than each capping layer 350, the refractive indices of each of the first optical layer 370a and the second optical layer 370b may be less than about 1.4.

On the other hand, the optical layer 370 may be thinner than the optical bonding layer 400. The thickness of the optical bonding layer 400 may be in a range of about 1 µm to about 5 µm, and the thickness of each of the first optical layer 370a and the second optical layer 370b may be less than about 1 µm to about 5 µm. In this case, the thickness of the first optical layer 370a and the thickness of the second optical layer 370b are independent. However, when the optical bonding layer 400 is about 5 μm thick, in the case that the thickness of the first optical layer 370a is about 3 μm and the thickness of the second optical layer 370b is about 4 μm, total reflection may be effectively achieved.

Also, a ratio of the thickness of the optical bonding layer 400 to the thickness of the optical layer 370 may be about 1:5 to about 1:1. In detail, the ratio of the thickness of the optical bonding layer to the thickness of the first optical layer may be about 1:5 to 1:1, and the ratio of the thickness of the optical bonding layer to the thickness of the second optical layer may be about 1:5 to 1:1. In this case of the thickness ratio, further improved light emission efficiency may be obtained.

In summary, to form the display device including the display panel 10 and the color conversion panel 30 to be a curved display device, stable combination of the two panels 10 and 30 and high temperature reliability is preferably obtained, and the optical bonding layer 400 is required for this. The optical bonding layer 400 may cause partial light loss. However, the color conversion panel including the optical layer according to an exemplary embodiment of the present invention increases the light amount emitted in the user direction by employing total reflection generated between the capping layer and the optical layer, thereby improving the light emission rate and the color reproducibility.

Next, the display panel 10 will be described with reference to FIG. 2 to FIG. 4.

The display panel 10 may include a liquid crystal panel 50 displaying an image, and polarizers 12 and 22 positioned on respective surfaces of the liquid crystal panel 50. The first polarizer 12 and the second polarizer 22 for polarizing the light incident from the light assembly 500 are positioned on respective (here, opposing) surfaces of the liquid crystal panel 50.

The present specification describes a display panel forming a vertical electric field, however the display panel is not limited thereto, and it may be a liquid crystal panel forming a horizontal electric field, a plasma display panel (PDP), an organic light emitting diode display (OLED), a surface conduction electron-emitter display (SED), a field emission display (FED), a vacuum fluorescent display (VFD), an E-paper, etc.

As an example, the display panel 10 forming a vertical electric field will be described in further detail below.

FIG. 2 shows a 2×2 pixel arrangement corresponding to a plurality of microcavities 305, and the display device according to an exemplary embodiment of the present invention may have these pixels repeatedly arranged both vertically and horizontally.

The liquid crystal panel 50 according to an exemplary embodiment of the present invention includes a gate line 121 positioned on a first substrate 110, and the gate line 121 includes a gate electrode 124.

A gate insulating layer 140 is positioned on the first substrate 110 and the gate line 121. A semiconductor layer 151 positioned under a data line 171 and a semiconductor layer 154 positioned under source/drain electrodes 173 and 175 and corresponding to a channel part of the thin film transistor Q are positioned on the gate insulating layer 140.

Data conductors 171, 173, and 175, i.e. the data line 171 including the source electrode 173 and the drain electrode 175, are positioned on the semiconductor layers 151 and 154 and the gate insulating layer 140.

The gate electrode 124, the source electrode 173, and the drain electrode 175 form a thin film transistor Q along with the semiconductor layer 154, and the channel of the thin film transistor Q is formed in the semiconductor layer 154 between the source electrode 173 and the drain electrode 175.

A first passivation layer 180a may be positioned on the data conductors 171, 173, and 175 and an exposed portion of the semiconductor layer 154. The first passivation layer 180a may include an inorganic insulator or an organic insulator such as a silicon nitride (SiNx) and a silicon oxide (SiOx).

A light blocking layer 220 and a second passivation layer 180b are positioned on the first passivation layer 180a.

The light blocking layer 220 is formed to have a lattice structure provided with an opening corresponding to an area for displaying an image, and is made of a material that does not transmit light. The second passivation layer 180b may include an inorganic insulator or organic insulator such as silicon nitride (SiNx) and silicon oxide (SiOx).

The first and second passivation layers 180a and 180b and the light blocking member 220 have a contact hole 185 exposing the drain electrode 175.

A pixel electrode 191 is positioned on the second passivation layer 180b. The pixel electrode 191 may be made of a transparent conductive material such as ITO or IZO.

The pixel electrode 191 may have an overall quadrangular shape, and may include a protrusion 197 protruding toward the thin film transistor Q. The protrusion 197 may be physically and electrically connected to the drain electrode 175 through the contact hole 185.

The above-described thin film transistor Q and pixel electrode 191 are just examples, and the structures of the thin film transistor and the design of the pixel electrode are not limited thereto. These structures and designs may be changed in various ways while remaining consistent with embodiments of the invention.

A lower alignment layer 11 is positioned on the pixel electrode 191, and an upper alignment layer 21 is positioned to overlap the lower alignment layer 11. The lower alignment layer 11 and the upper alignment layer 21 may be vertical alignment layers. The lower alignment layer 11 may include at least one among generally-used materials such as polyamic acid, polysiloxane, or polyimide.

In the present exemplary embodiment, an alignment material forming the alignment layers 11 and 21 and liquid crystal molecules 31 may be injected into the microcavities 305 by using a capillary force. In the present exemplary embodiment, the lower alignment layer 11 and the upper alignment layer 21 are only divided depending on the position, as shown in FIG. 4, and may be connected to each other. The lower alignment layer 11 and the upper alignment layer 21 may be simultaneously formed.

The microcavities 305 are positioned between the lower alignment layer 11 and the upper alignment layer 21, and the liquid crystal molecules 31 injected into the microcavities 305 form a liquid crystal layer 3.

The plurality of microcavities 305 may be arranged in a matrix format. Microcavities 305 adjacent in a Y direction may be separated or distinguished from each other by a plurality of liquid crystal inlets 307FP overlapping the gate lines 121. Microcavities 305 adjacent in an X direction may be distinguished from each other by partition wall portions PWP. Each of the microcavities 305 may correspond to one or more pixel areas, and the pixel areas may correspond to an area for displaying an image.

A common electrode 270 and a third passivation layer 340 are positioned on the upper alignment layer 21. The common electrode 270 receives a common voltage, generates an electric field along with the pixel electrode 191 receiving a data voltage, and thereby determines a direction in which the liquid crystal molecules 31 positioned in the microcavities 305 between the two electrodes are inclined. The common electrode 270 forms a capacitor along with the pixel electrode 191, such that the applied voltage is maintained after the thin film transistor is turned off. The third passivation layer 340 may be formed of silicon nitride (SiNx) or silicon oxide (SiOx).

In the present exemplary embodiment, the common electrode 270 is positioned on the microcavities 305, however the common electrode 270 may be positioned under the microcavities 305 as another exemplary embodiment to realize liquid crystal driving according to a coplanar electrode (CE) mode.

A roof layer 360 is positioned on the third insulating layer 340. The roof layer 360 serves as a support so that the microcavity 305, which is a space between the pixel electrode 191 and the common electrode 270, is formed. The roof layer 360 may include a photoresist, or other organic materials.

A fourth passivation layer 380 is positioned on the roof layer 360. The fourth passivation layer 380 may be in contact with an upper surface of the roof layer 360, and may be omitted depending on an exemplary embodiment.

In the present exemplary embodiment, the partition wall portion PWP is positioned between microcavities 305 adjacent in the X direction. The partition wall portion PWP may be formed along the Y-axis direction as the direction in which the data line 171 extends, and may be covered by the roof layer 360. The partition wall portion PWP is filled with the common electrode 270, the third insulating layer 340, the roof layer 360, and the fourth insulating layer 380, and the microcavities 305 may be divided or defined by this structure, which forms a partition wall.

A capping layer 390 is positioned on the fourth passivation layer 380. The capping layer 390 includes organic material or inorganic material. In the present exemplary embodiment, the capping layer 390 may also be positioned in a liquid crystal inlet 307FP as well as on the fourth passivation layer 380. In this case, the capping layer 390 may cover the liquid crystal inlet 307FP of the microcavity 305.

In the display device according to an exemplary embodiment of the present invention, the light emission rate and the color reproducibility are improved such that a display device with excellent display quality may be provided and a substrate of one sheet may be used, thereby simplifying the manufacturing process and the structure.

Next, a light emission rate of the display device according to exemplary embodiments of the present invention and a comparative example will be described with reference to Table 1.

TABLE 1

| | Exemplary Embodiment 1 | Exemplary Embodiment 2 | Exemplary Embodiment 3 | Comparative example |
|---|---|---|---|---|
| Light emission rate | 78% | 76.4% | 81.8% | 57.7% |

Exemplary Embodiment 1 relates to a display device including the first optical layer positioned between the first capping layer and the second capping layer, Exemplary Embodiment 2 relates to a display device including the second optical layer positioned between the second capping layer and the optical bonding layer, and Exemplary Embodiment 3 relates to a display device including both the first optical layer and the second optical layer. The comparative example relates to the display device in which the color conversion panel and the display panel are connected through the optical bonding layer and does not include the optical layer, a configuration that is different from the exemplary embodiments.

Referring to this, in the case of Exemplary Embodiments 1 to 3 including the optical layer, it may be confirmed that the light emission rate is higher than that of the comparative example by 20% or more. Also, among the plurality of exemplary embodiments, when the first optical layer and the second optical layer are both included, it may be confirmed that the highest light emission rate appears.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Various features of the above described and other embodiments can be mixed and matched in any manner, to produce further embodiments consistent with the invention.

DESCRIPTION OF SYMBOLS

10: display panel
30: color conversion panel
400: optical bonding layer
310: substrate
330: color conversion layer
350a, 350b: first capping layer, second capping layer
370a, 370b: first optical layer, second optical layer

What is claimed is:
1. A display device comprising:
a display panel;
a color conversion panel overlapping the display panel; and
an interlayer positioned between the display panel and the color conversion panel,
wherein the color conversion panel includes:
a substrate;
a color conversion layer and a transmission layer positioned between the substrate and the display panel;
a capping layer overlapping the color conversion layer and the transmission layer; and
an optical layer positioned between the capping layer and the color conversion layer,
wherein a refractive index of the optical layer is lower than a refractive index of the capping layer.
2. The display device of claim 1,
wherein the optical layer is a first optical layer, and
the display device further comprises a second optical layer positioned between the capping layer and the interlayer.
3. The display device of claim 1, wherein
the optical layer includes at least one of a fluorine-containing copolymer, porous silica, a porous silicon oxide, a silicon oxide, a porous metal oxide, a porous polymer, and an acryl-based resin.
4. The display device of claim 1, wherein the capping layer has a structure in which layers having different refractive indexes are stacked.

5. The display device of claim 1, wherein
the capping layer includes at least one of TiO2, SiNx, SiOx, TiN, AlN, Al2O3, SnO2, WO3, and ZrO2.

6. The display device of claim 1, further comprising a first capping layer disposed between the optical layer and the color conversion layer, and
wherein the capping layer is a second capping layer.

7. The display device of claim 6,
the first capping layer includes inorganic material.

8. The display device of claim 6, wherein
the first capping layer includes silicon nitride.

9. The display device of claim 6, wherein
the refractive index of the first capping layer is about 1.8 to about 1.9, and
the refractive index of the second capping layer is about 1.4 to about 1.9.

10. The display device of claim 1, wherein
a thickness of the optical layer is less than a thickness of the interlayer.

11. The display device of claim 10, wherein
a ratio of the thickness of the interlayer to the thickness of the optical layer is about 1:5 to 1:1.

12. The display device of claim 1, wherein the transmission layer transmits blue light from a light assembly.

13. The display device of claim 1, wherein
the interlayer includes a fluoroacryl-based resin.

14. The display device of claim 1, further comprising
a color filter positioned between the substrate and the color conversion layer.

15. The display device of claim 14, wherein
the color conversion layer includes a red color conversion layer and a green color conversion layer, and
the red color conversion layer and the green color conversion layer each include a quantum dot.

16. The display device of claim 15, wherein
the color filter comprises a red color filter overlapping the red color conversion layer, and a green color filter overlapping the green color conversion layer.

17. The display device of claim 1, wherein
the color conversion layer and the transmission layer include a scattering member.

18. A display device comprising:
a display panel;
a color conversion panel overlapping the display panel; and
an interlayer positioned between the display panel and the color conversion panel,
wherein the color conversion panel includes:
a substrate;
a color conversion layer and a transmission layer positioned between the substrate and the display panel;
a capping layer overlapping the color conversion layer and the transmission layer;
a first optical layer positioned between the capping layer and the color conversion layer; and
a second optical layer positioned between the capping layer and the interlayer,
wherein a refractive index of the optical layer is lower than a refractive index of the capping layer.

19. The display device of claim 18, wherein
the color conversion layer includes a red color conversion layer and a green color conversion layer, and
the red color conversion layer and the green color conversion layer each include a quantum dot, and
the color filter comprises a red color filter overlapping the red color conversion layer, and a green color filter overlapping the green color conversion layer.

20. The display device of claim 18, wherein the transmission layer include a scattering member.

* * * * *